(12) United States Patent
Kp et al.

(10) Patent No.: US 10,275,924 B2
(45) Date of Patent: Apr. 30, 2019

(54) TECHNIQUES FOR MANAGING THREE-DIMENSIONAL GRAPHICS DISPLAY MODES

(71) Applicant: Intel Corporation, Santa Clara, CA (US)

(72) Inventors: Sameer Kp, Bangalore (IN); Sanjeev Tiwari, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/127,960

(22) PCT Filed: Dec. 19, 2012

(86) PCT No.: PCT/US2012/070691
§ 371 (c)(1),
(2) Date: Dec. 19, 2013

(87) PCT Pub. No.: WO2013/101602
PCT Pub. Date: Jul. 4, 2013

(65) Prior Publication Data
US 2014/0192062 A1 Jul. 10, 2014

(30) Foreign Application Priority Data
Dec. 26, 2011 (IN) .......................... 3814/DEL/2011

(51) Int. Cl.
*G06T 1/00* (2006.01)
*G06T 15/00* (2011.01)

(52) U.S. Cl.
CPC ................................. *G06T 15/005* (2013.01)

(58) Field of Classification Search
CPC ........... G06T 1/20; G06T 15/005; G06T 1/60; G09G 5/363; G06F 3/14
(Continued)

(56) References Cited

U.S. PATENT DOCUMENTS 6,252,600 B1 * 6/2001 Kohli et al. .................. 345/419
6,288,730 B1 * 9/2001 Duluk, Jr. ................. G06T 1/60
345/428
(Continued)

FOREIGN PATENT DOCUMENTS

JP     2003333624      11/2003
KR     10-2011-0128535 A   11/2011

OTHER PUBLICATIONS

Blunden, B. Memory Management Algorithms and Implementation in C/C++, Texas, Wordware Publishing, Inc. 2003. pp. 157-163.*
(Continued)

*Primary Examiner* — Gordon G Liu

(57) ABSTRACT

Techniques for managing a three-dimensional (3D) graphics display mode are described. In one embodiment, for example, an apparatus may comprise a processor circuit and a graphics processing module, and the graphics processing module may be operative by the processor circuit to execute a graphics context in a 3D display mode if a 3D-aware graphics context data structure includes an entry corresponding to the graphics context or to execute the graphics context in a non-3D display mode if the 3D-aware graphics context data structure does not include an entry corresponding to the graphics context. Other embodiments are described and claimed.

9 Claims, 11 Drawing Sheets

(58) Field of Classification Search
USPC .......................................................... 345/501
See application file for complete search history.

(56) References Cited

U.S. PATENT DOCUMENTS

| | | | | |
|---|---|---|---|---|
| 6,609,977 | B1* | 8/2003 | Shimizu | A63F 13/02 463/36 |
| 8,286,079 | B2* | 10/2012 | Song | G06F 3/0481 345/173 |
| 8,531,448 | B2* | 9/2013 | Takemoto | G06F 17/214 345/419 |
| 2003/0197737 | A1 | 10/2003 | Kim | |
| 2007/0165035 | A1* | 7/2007 | Duluk et al. | 345/506 |
| 2007/0242068 | A1 | 10/2007 | Han et al. | |
| 2008/0062069 | A1 | 3/2008 | Sinclair et al. | |
| 2008/0303832 | A1* | 12/2008 | Kim | G09G 3/003 345/501 |
| 2008/0309755 | A1 | 12/2008 | Yoshida et al. | |
| 2010/0039428 | A1 | 2/2010 | Kim et al. | |
| 2010/0303442 | A1 | 12/2010 | Newton et al. | |
| 2011/0164121 | A1* | 7/2011 | Ikeda | G11B 27/105 348/51 |
| 2012/0162367 | A1 | 6/2012 | Ha | |
| 2012/0268575 | A1* | 10/2012 | Senuma | H04N 13/0051 348/51 |
| 2014/0146188 | A1* | 5/2014 | Ju | H04N 5/23241 348/207.1 |

OTHER PUBLICATIONS

International Search Report and Written Opinion, dated Apr. 25, 2013 Application No. PCT/US2012/070691, Filed Date: Dec. 19, 2012, pp. 11.

Office Action and Search Report received for Chinese Patent Application No. 201280064531.6, dated Jan. 20, 2016, 12 pages (untranslated).

* cited by examiner

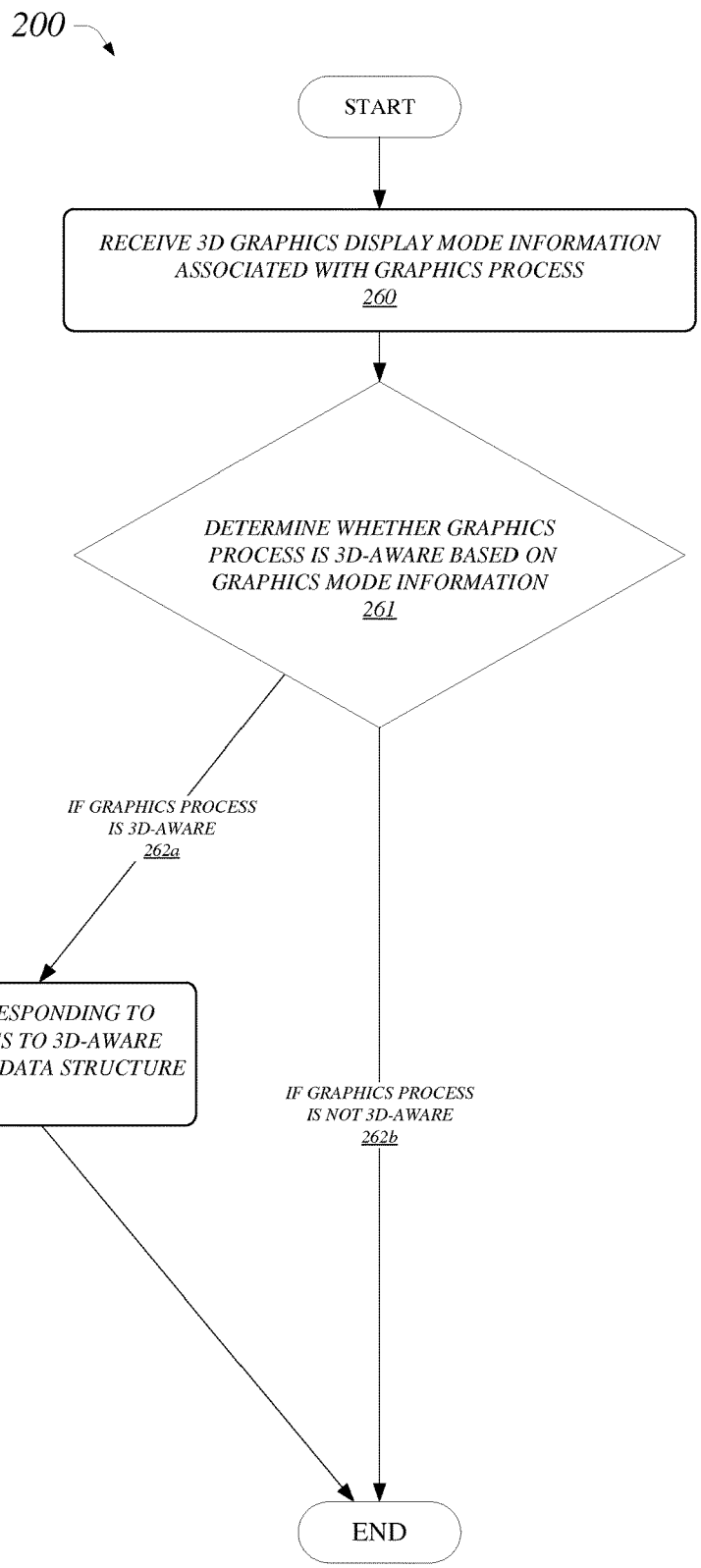

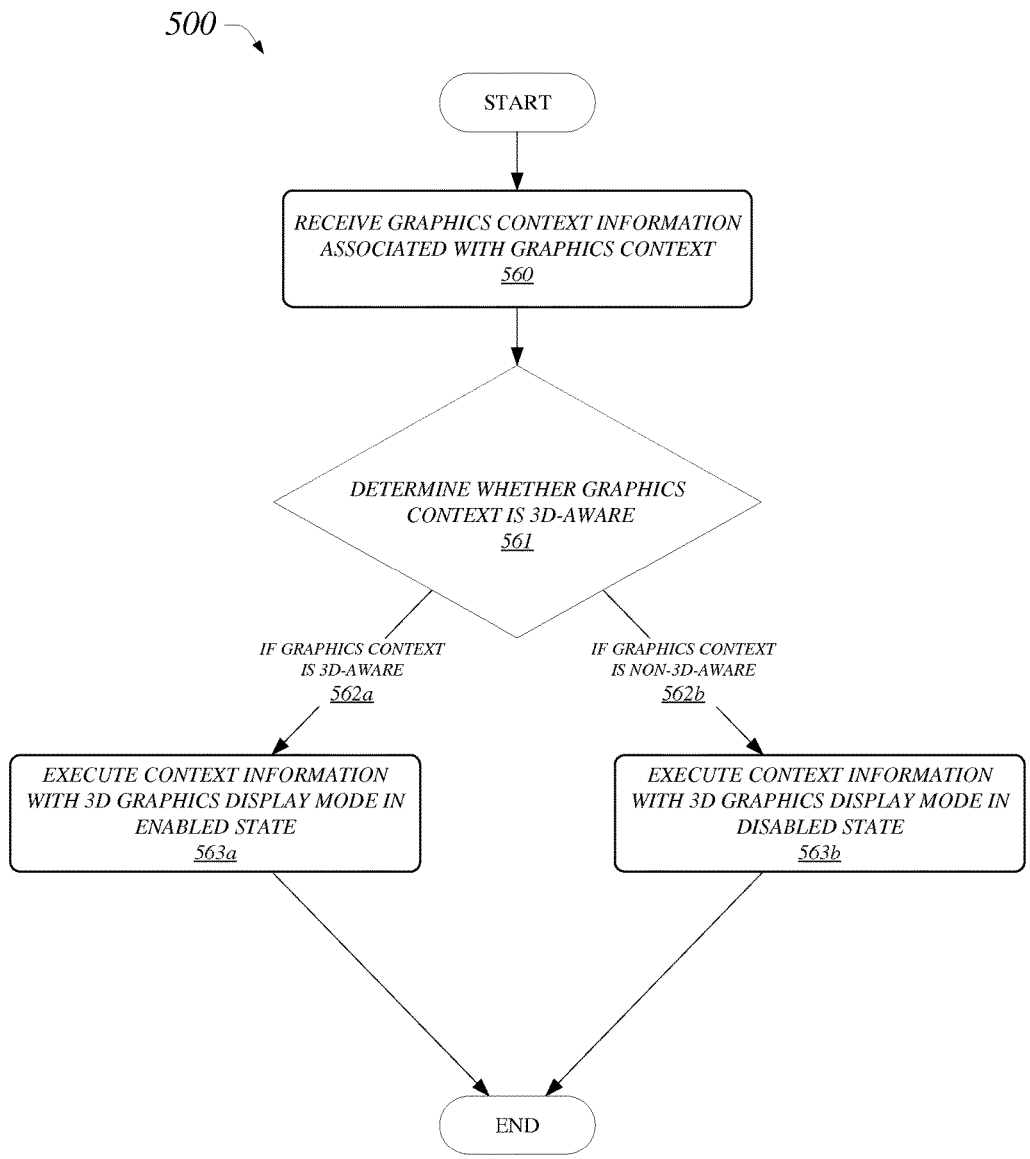

FIG. 6A

3D-AWARE GRAPHICS CONTEXT DATA STRUCTURE
600A

| CONTEXT | PROCESS | DISPLAY |
|---|---|---|
| ContextID1 <br> 627-1-a | ProcessID1 <br> 627-1-b | DisplayID1 <br> 627-1-c |
| ContextID2 <br> 627-2-a | ProcessID2 <br> 627-2-b | DisplayID2 <br> 627-2-c |
|  |  |  |

FIG. 6B

3D-AWARE GRAPHICS CONTEXT DATA STRUCTURE
600B

| CONTEXT | PROCESS | DISPLAY |
|---|---|---|
| ContextID1 <br> 627-1-a | ProcessID1 <br> 627-1-b | DisplayID1 <br> 627-1-c |
| ContextID2 <br> 627-2-a | ProcessID2 <br> 627-2-b | DisplayID2 <br> 627-2-c |
| ContextID3 <br> 627-3-a | ProcessID3 <br> 627-3-b | DisplayID3 <br> 627-3-c |

FIG. 9
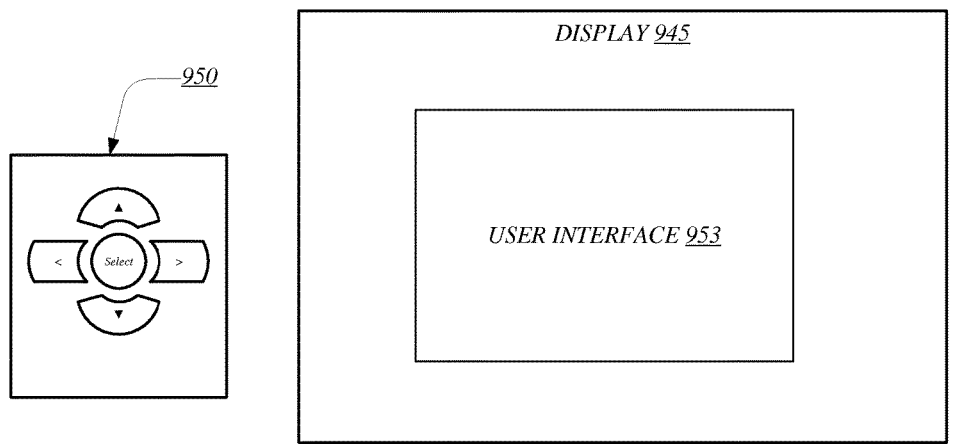
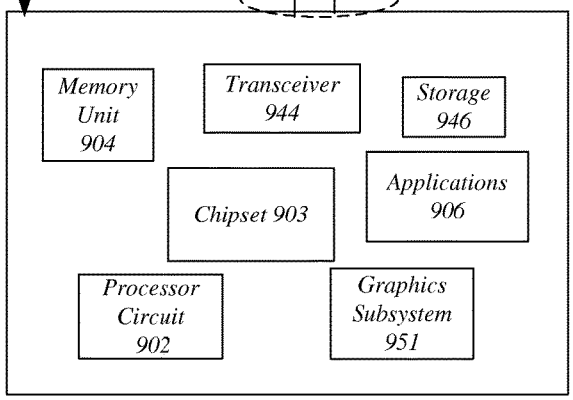

TECHNIQUES FOR MANAGING THREE-DIMENSIONAL GRAPHICS DISPLAY MODES

BACKGROUND

In a computing system that supports three-dimensional (3D) graphics display modes, the operating system may not be 3D-aware, and support for the 3D graphics display modes may be implemented by other components of the system. Under such circumstances, the task of enabling or disabling the 3D graphics display modes may be left to the various graphics applications that use those display modes. For example, a 3D-aware graphics application may send an instruction to elements of the computing device to enter a 3D-enabled state, and upon termination, may send an instruction to elements of the computing device to exit the 3D-enabled state. However, if the 3D-aware graphics application terminates unexpectedly, it may fail to send an instruction to exit the 3D-enabled state, and the 3D-enabled state may persist unnecessarily. As such, there may be disadvantages associated with managing 3D graphics display modes from within the graphics applications that use them, such as excess power consumption and/or display corruption that may result from unnecessarily persisting a 3D-enabled state. Accordingly, techniques for managing 3D graphics display modes from outside of the graphics applications that use them are desirable.

BRIEF DESCRIPTION OF THE DRAWINGS

FIG. 2 illustrates one embodiment of a first logic flow.

FIG. 5 illustrates one embodiment of a fourth logic flow.

FIG. 6A illustrates one embodiment of a data structure.

FIG. 6B illustrates another embodiment of a data structure.

FIG. 9 illustrates one embodiment of a third system.

DETAILED DESCRIPTION

Various embodiments may be generally directed to techniques for managing 3D graphics display modes, which may comprise stereoscopic 3D display modes in some embodiments. In one embodiment, for example, an apparatus may comprise a processor circuit and a graphics processing module, and the graphics processing module may be operative by the processor circuit to execute a graphics context in a 3D graphics display mode if a 3D-aware graphics context data structure includes an entry corresponding to the graphics context or to execute the graphics context in a non-3D graphics display mode if the 3D-aware graphics context data structure does not include an entry corresponding to the graphics context. In this manner, excess power consumption and display corruption that may result from unnecessarily maintaining 3D graphics display modes may be reduced. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1A:
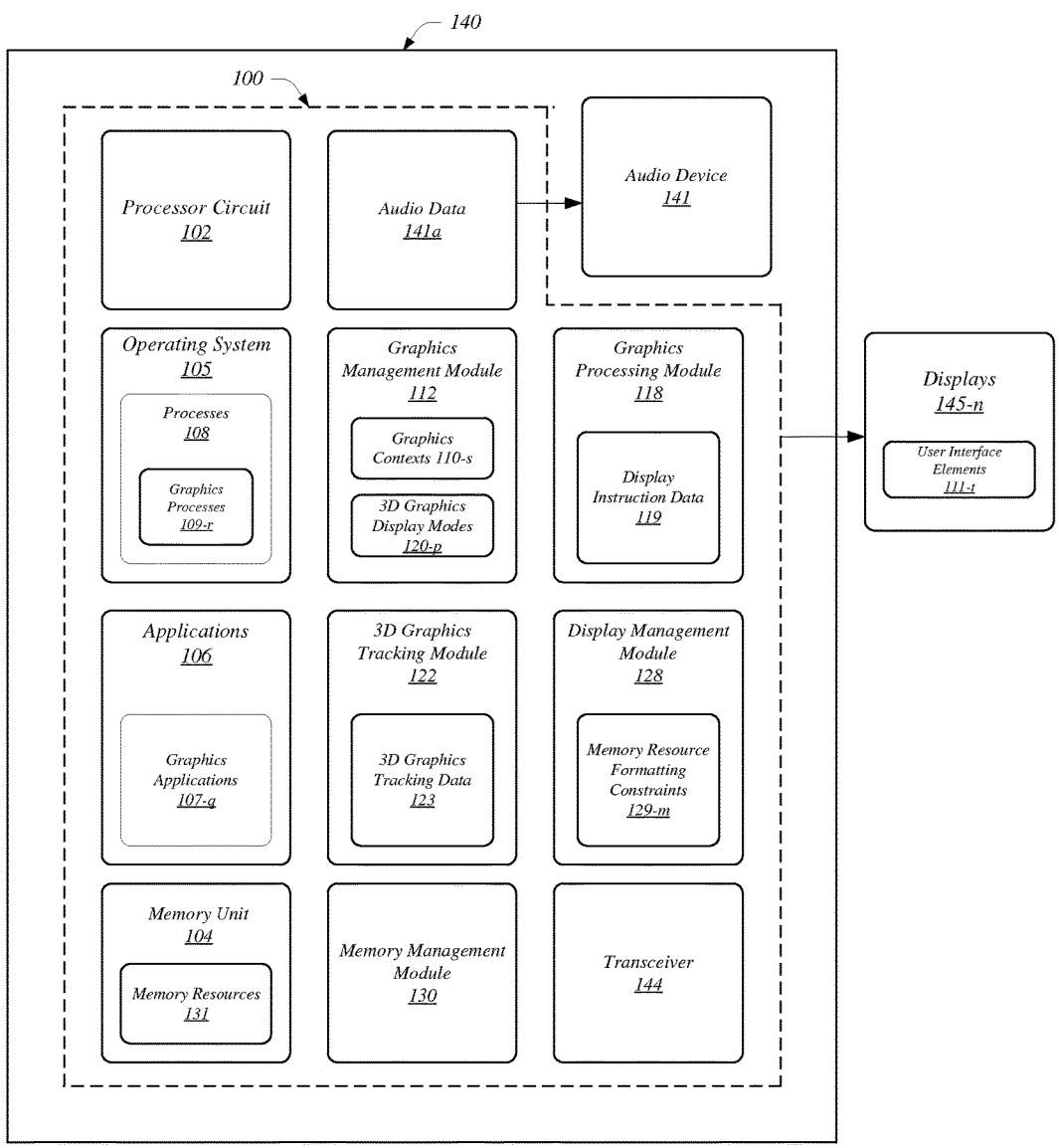
FIG. 1A illustrates one embodiment of a first apparatus and one embodiment of a first system.

FIG. 1A illustrates a block diagram of an apparatus 100. As shown in FIG. 1A, apparatus 100 comprises multiple elements including a processor circuit 102, a memory unit 104, an operating system 105, one or more applications 106, a graphics management module 112, a graphics processing module 118, a 3D graphics tracking module 122, a display management module 128, a memory management module 130, and a transceiver 144. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by INTEL® Corporation, Santa Clara, Calif. The embodiments are not limited in this context.

In some embodiments, apparatus 100 may comprise a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. The embodiments are not limited in this context.

In various embodiments, processor circuit 102 may be operative to execute an operating system 105. Operating system 105 may contain, communicate, generate, obtain, and provide program component, system, user, and data communications, requests, and responses, and may be operative to facilitate interaction with and/or interaction between various hardware and/or software components, such as communications networks, network interfaces, data, I/O, peripheral devices, storage devices, program components, memory devices, user input devices, and the like. Operating system 105 may comprise programming logic operative to utilize and/or control one or more hardware and/or software elements of apparatus 100. For example, operating system 105 may be operative to receive input through one or more input devices, receive information from one or more external devices through one or more communications channels, generate instructions for transmission to one or more elements of apparatus 100 and/or one or more external devices, and/or implement applications 106. Operating system 105 may also provide communications protocols that allow apparatus 100 to communicate with other entities through a communications network, such as multicast, TCP/IP, UDP, unicast, and the like. Examples of operating system 105 include, but are not limited to, Apple Macintosh OS, Apple Macintosh OS X (Server), AT&T Plan 9, Be OS, IBM OS/2, Microsoft DOS, Microsoft Windows 2000/2003/3.1/95/98/7, Microsoft Windows CE/Millenium/NTNista/XP, Palm OS, Unix, a Unix-like system distribution (such as AT&T's UNIX, a Berkley Software Distribution (BSD) variation such as FreeBSD, NetBSD, or OpenBSD, or a Linux distribution such as Red Hat or Ubuntu), or a like operating system. The embodiments are not limited in this context.

In some embodiments, operating system 105 may be operative to create one or more processes 108. Each process 108 may comprise one or more logical or programming constructs comprising instructions that processor circuit 102 is operative to execute in order to perform operations associated with a corresponding application 106, or with operating system 105. Any particular process 108 may also include one or more logical or programming constructs that identify resources that are associated with that particular process 108. For example, in an apparatus on which an audio application is executing to play an audio file, there may be a process corresponding to the audio application, and the process may comprise instructions that the processor executes to implement play back of the audio file, as well as information that identifies the memory location of the data corresponding to the audio file. The embodiments are not limited in this context.

In various embodiments, applications 106 may comprise one or more graphics applications 107-$q$, and processes 108 may comprise one or more graphics processes 109-$r$. It is worthy to note that "q" and "r" and similar designators as used herein are intended to be variables representing any positive integer. Thus, for example, if an implementation sets a value for r=5, then a complete set of graphics processes 109-$r$ may include graphics processes 109-1, 109-2, 109-3, 109-4 and 109-5. The embodiments are not limited in this context.

Graphics applications 107-$q$ may comprise any application(s) featuring graphics capabilities, such as, for example, an image or video viewing application, an image or video playback application, a streaming video playback application, a multimedia application program, a system program, a conferencing application, a gaming application, a productivity application, a messaging application, an instant messaging (IM) application, an electronic mail (email) application, a short messaging service (SMS) application, a multimedia messaging service (MMS) application, a social networking application, a web browsing application, and so forth. The embodiments are not limited in this context.

One or more of graphics processes 109-$r$ may correspond to graphics applications 107-$q$, and may be created by operating system 105. In some embodiments, operating system 105 may itself be a graphics application as defined herein, and thus graphics applications 107-$q$ may comprise operating system 105. In various such embodiments, one or more of graphics processes 109-$r$ may correspond to operating system 105. The embodiments are not limited in this context.

In some embodiments, there may be the same number of graphics processes 109-$r$ as there are graphics applications 107-$q$, and/or graphics processes 109-$r$ may comprise a graphics process 109-$x$ for each graphics application 107-$x$. In other embodiments, there may be a different number of graphics processes 109-$r$ than there are graphics applications 107-$q$, and/or graphics processes 109-$r$ may comprise multiple graphics processes that correspond to the same graphics application. The embodiments are not limited to this example.

In some embodiments, graphics applications 107-$q$ may be operative to generate one or more graphics contexts 110-$s$ associated with graphics processes 109-$r$. In various such embodiments, more than one of graphics contexts 110-$s$ may be associated with the same particular graphics process 109-$x$. Each of graphics contexts 110-$s$ may comprise data, information, or logic corresponding to one or more user interface elements 111-$t$. User interface elements 111-$t$ may comprise any visual or optical sensory effect(s) capable of being produced by a digital display, such as, for example, images, pictures, video, text, graphics, menus, textures, and/or patterns. The data, information, or logic comprised within graphics contexts 110-$s$ may be usable by apparatus 100 and/or one or more elements external to apparatus 100 to cause user interface elements 111-$t$ to be produced by one or more displays 145-$n$. For example, graphics contexts 110-$s$ may comprise data, information, or logic operative to cause one or more components of apparatus 100 to render images on one or more graphics frame buffers, and to transmit data from the one or more graphics frame buffers to one or more other internal or external components that generate user interface elements 111-$t$ based on the data in the one or more frame buffers. The embodiments are not limited in this context.

In some embodiments, apparatus 100 may comprise a graphics management module 112. Graphics management module 112 may comprise a graphics driver in various embodiments. Examples of graphics management module 112 may include but are not limited to a graphics driver microchip or card, graphics driver circuitry integrated into a multi-purpose microchip or card, and a graphics driver implemented as software. The embodiments are not limited in this respect.

In various embodiments, apparatus 100 may be arranged to communicatively couple with one or more displays 145-$n$. Display(s) 145-$n$ may comprise any device(s) capable of displaying one or more user interface elements. Examples for display(s) 145-$n$ may include a television, a monitor, a projector, and a computer screen. In one embodiment, for example, display(s) 145-$n$ may be implemented by liquid crystal display (LCD) displays, light emitting diode (LED) displays, or other types of suitable visual interfaces. Display(s) 145-$n$ may comprise, for example, touch-sensitive color display screens. In various implementations, display(s) 145-$n$ may comprise one or more thin-film transistors (TFT) LCD including embedded transistors. The embodiments are not limited in this context.

In various embodiments, apparatus 100 may comprise a graphics processing module 118. Graphics processing module 118 may comprise any combination of hardware and/or software capable of generating display instruction data 119 for transmission to display(s) 145-$n$. Display instruction data 119 may comprise programming logic, data, or information usable by display(s) 145-$n$ to render user interface elements 111-$t$. In some embodiments, graphics processing module 118 may be implemented as hardware. In various such embodiments, graphics processing module 118 may comprise a dedicated graphics processing unit implemented using any processor or logic device such as those described with respect to processor circuit 102, or as a graphics processing microchip or card or graphics processing circuitry integrated into a multipurpose microchip or card. In other such embodiments, graphics processing module 118 may be implemented using a portion of the shared processing capabilities of a multipurpose processing circuit. In yet other embodiments, graphics processing module 118 may be implemented as software and may comprise logic for generating display data for transmission to display(s) 145-$n$. In still other embodiments, graphics processing module 118 may be implemented as a combination of hardware and software. The embodiments are not limited in this respect.

In some embodiments, apparatus 100 may be operative to generate graphics contexts 110-$s$ corresponding to user interface elements 111-$t$, and graphics processing module 118 may be operative to generate display instruction data 119 corresponding to those user interface elements 111-$t$ by performing processing on graphics contexts 110-$s$. Apparatus 100 may then transmit the display instruction data 119 to display(s) 145-$n$, and display(s) 145-$n$ may receive the display instruction data 119 and use it to generate the user interface elements 111-$t$.

In various embodiments, one or more of user interface elements 111-$t$ may comprise 3D user interface elements, and one or more of graphics contexts 110-$s$ may comprise 3D graphics contexts. 3D user interface elements may comprise 3D images, 3D pictures, 3D text, 3D graphics, 3D menus, 3D textures, 3D patterns, and/or any other 3D visual or optical sensory effect(s) capable of being produced by a digital display, and 3D graphics contexts may comprise data, information, or logic corresponding to one or more 3D user interface elements. In some embodiments, one or more of display(s) 145-$n$ may be 3D displays. 3D displays may comprise any device capable of displaying one or more 3D user interface elements. In various embodiments, display instruction data 119-$t$ may comprise 3D display instruction data. 3D display instruction data may comprise programming logic, data, or information usable by one or more 3D displays to produce 3D user interface elements. The embodiments are not limited in this context.

In some embodiments, graphics management module 112 may set and/or monitor one or more states of one or more 3D graphics display modes 120-$p$ corresponding to display(s) 145-$n$. In various such embodiments, there may be the same number of 3D graphics display modes 120-$p$ as there are displays 145-$n$, and/or 3D graphics display modes 120-$p$ may comprise a 3D graphics display mode 120-$x$ for each display 145-$x$. For example, if displays 145-$n$ comprise only a single display 145-1, then 3D graphics display modes 120-$p$ may comprise only a single 3D graphics display mode 120-1, corresponding to display 145-1. In other embodiments, there may be a different number of 3D graphics display modes 120-$p$ than displays 145-$n$, and/or 3D graphics display modes 120-$p$ may comprise a 3D graphics display mode that corresponds to multiple displays, and/or a group of graphics display modes that correspond to the same display. In some embodiments, each 3D graphics display mode 120-$x$ may comprise a parameter that determines whether graphics management module 112 generates 3D display instruction data for transmission to one or more of displays 145-$n$. For example, each 3D graphics display mode 120-$x$ may comprise a state variable that may be set to an enabled state and/or to a disabled state by apparatus 100 and/or by one or more elements external to apparatus 100. When a particular display mode 120-$x$ is set to an enabled state, apparatus 100 may produce 3D display instruction data for a particular display 145-$x$ associated with the particular display mode 120-$x$. When the particular display mode 120-$x$ is set to a disabled state, apparatus 100 may not produce 3D display instruction data for the particular display 145-$x$ associated with the particular display mode 120-$x$. The embodiments are not limited to these examples.

In various embodiments, graphics management module 112 may set states of one or more of 3D graphics display modes 120-$p$ based on 3D graphics display mode information. 3D graphics display mode information may comprise programming logic, data, and/or instructions indicating states to which one or more of 3D graphics display modes 120-$p$ should be set, as well as programming logic, data, and/or instructions identifying the particular display 145-$x$ with which each particular 3D graphics display mode 120-$y$ corresponds. Graphics management module 112 may receive 3D graphics display mode information from operating system 105, one or more of graphics applications 107-$q$, and/or from one or more other components of apparatus 100. Graphics management module 112 may also generate 3D graphics display mode information internally. The embodiments are not limited in this context.

In some embodiments, one or more of graphics application(s) 107-$q$ may comprise a 3D-aware graphics application(s), and one or more of graphics process(es) 109-$r$ may comprise a 3D-aware graphics process(es). A 3D-aware graphics application may comprise any graphics application that is capable of generating 3D graphics contexts and of causing graphics management module 112 to set one or more 3D graphics display modes 120-$p$ to an enabled state and/or to a disabled state. A 3D-aware graphics process may comprise a graphics process corresponding to a 3D-aware graphics application.

In other embodiments, graphics application(s) 107-$q$ may be non-3D-aware graphics application(s), and graphics process(es) 109-$r$ may be non-3D-aware graphics process(es). A non-3D-aware graphics application may comprise any graphics application that is incapable of generating 3D graphics contexts or of causing graphics management module 112 to enable and/or disable a 3D graphics display mode, and a non-3D-aware graphics process may comprise a graphics process corresponding to a non-3D-aware graphics application.

At a particular point in time at which apparatus 100 is operative to generate and transmit, for consumption by a particular display, display instruction data corresponding to one or more particular graphics contexts, the one or more graphics processes associated with the one or more particular graphics contexts may be referred to as active graphics processes with respect to that particular display. In various embodiments, at any particular point in time with respect to a particular display, there may be only one active graphics process, or there may be more than one active graphics process. The existence of only one active graphics process with respect to a particular display may correspond to circumstances under which display instruction data generated for the particular display is associated with graphics contexts corresponding to only one graphics application. For example, there may be only one active graphics process with respect to a particular display when a gaming application is executing in a full-screen display mode on that particular display.

The existence of more than one active graphics process with respect to a particular display may correspond to circumstances under which display instruction data generated for the particular display is associated with graphics contexts corresponding to more than one graphics application. For example, there may be more than one active graphics process with respect to a particular display when a gaming application is executing in a windowed display mode within an operating system desktop on that particular display. The embodiments are not limited in this context.

In some embodiments, graphics management module 112 may set a particular 3D graphics display mode corresponding to a particular display to an enabled state or a disabled state based on whether there are any active 3D graphics processes with respect to that particular display. For example, if there are two active graphics processes with respect to a particular display, and one of the active graphics processes is a 3D-aware graphics process, graphics management module 112 may set the particular graphics display mode corresponding to that particular display to an enabled state. In another example, if there are two active graphics processes with respect to a particular display, but neither of the active graphics processes is a 3D-aware graphics process, graphics management module 112 may set the particular graphics display mode corresponding to that particular display to a disabled state. The embodiments are not limited to these examples.

In various embodiments, apparatus 100 may comprise a display management module 128. Display management module 128 may comprise a display driver in various embodiments. Examples of display management module 128 may include but are not limited to a display driver microchip or card, display driver circuitry integrated into a multi-purpose microchip or card, and a display driver implemented as software. Display management module 128 may comprise programming logic, information, or data describing one or more capabilities of displays 145-$n$, and one or more components of apparatus 100 may be operative to determine one or more capabilities of displays 145-$n$ by querying display management module 128. For example, in various embodiments, graphics management module 112 may query display management module 128 to determine whether a particular display is a 3D display, and display management module 128 may comprise information indicating whether the particular display is a 3D display. Display management module 128 may transmit the information indicating whether the particular display is a 3D display to graphics management module 112, and graphics management module may set a 3D graphics display mode corresponding to the particular display to an enabled state or a disabled state based on whether the particular display is a 3D display. In an example of such an embodiment, graphics management module 112 may query display management module 128 to determine whether display 145-1 is a 3D display, receive a response indicating that display 145-1 is a 3D display, and set a 3D graphics display mode corresponding to display 145-1 to an enabled state based on the received response. The embodiments are not limited to this example.

In various embodiments, display management module 128 may comprise one or more memory resource formatting constraints 129-$m$ of displays 145-$n$. For example, a particular display may require a certain format for incoming display instruction data, which in turn may require that memory resources used to store graphics contexts from which the display instruction data is derived conform to one or more memory resource formatting constraints. In such a case, display management module 128 may comprise one or more memory resource formatting constraints corresponding to that particular display. The embodiments are not limited in this respect.

In some embodiments, apparatus 100 may comprise a 3D graphics tracking module 122. 3D graphics tracking module 122 may comprise logic operative to receive, analyze, and retain 3D graphics tracking data 123. 3D graphics tracking data 123 may comprise any information pertaining to configuration or operation of operating system 105, graphics application(s) 107-$q$, graphics management module 112, 3D graphics tracking module 122, and/or any other elements of apparatus 100 that are operative to implement creation, transformation, storage, display, and/or transmission of one or more 3D graphics contexts and/or one or more 3D user interface elements. 3D graphics tracking data 123 may also comprise any information pertaining to configuration or operation of elements external to apparatus 100 that are operative to implement creation, transformation, storage, display, and/or transmission of one or more 3D graphics contexts and/or one or more 3D user interface elements.

In various embodiments, particular 3D graphics tracking data may comprise programming logic, data, or information identifying one or more particular graphics processes that are 3D-aware, and/or one or more particular displays associated with those particular graphics processes. In some embodiments, particular 3D graphics tracking data may comprise programming logic, data, or information identifying one or more particular graphics contexts that are 3D graphics contexts, one or more particular graphics processes to which those one or more particular graphics contexts correspond, and/or one or more particular displays associated with those one or more particular graphics processes. In some such embodiments, the 3D graphics tracking data may comprise information describing associations between particular 3D-aware graphics processes and/or particular 3D graphics contexts and particular displays. In various embodiments, 3D graphics tracking module 122 may comprise an application, a driver, a chip or integrated circuit, or any combination of software and/or hardware elements comprising logic capable of receiving, analyzing, and retaining graphics operation data. The embodiments are not limited in this respect.

In some embodiments, apparatus 100 may comprise a memory management module 130. Memory management module 130 may comprise a memory driver in various embodiments. Examples of memory management module 130 may include but are not limited to a memory driver microchip or card, memory driver circuitry integrated into a multi-purpose microchip or card, and memory driver implemented as software. The embodiments are not limited in this respect.

In various embodiments, memory management module 130 may be operative to allocate space for logic or data in memory unit 104, store logic or data in memory unit 104, and/or to retrieve logic or data from memory unit 104. In some such embodiments, memory management module 130 may be operative to create one or more memory resources 131 in memory unit 104, which may allocate space for one or more graphics contexts in memory unit 104 and store those one or more graphics contexts in the allocated space in memory unit 104. The embodiments are not limited in this context.

In some embodiments, apparatus 100 may comprise a transceiver 144. Transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 144 may operate in accordance with one or more applicable standards in any version. The embodiments are not limited in this context.

FIG. 1A may also illustrate a block diagram of a system 140 in various embodiments. System 140 may comprise any of the aforementioned elements of apparatus 100. System 140 may further comprise an audio device 141 in some embodiments. Audio device 141 may comprise any device capable of generating tones, music, speech, speech utterances, sound effects, background noise, or other sounds based on received audio data. Examples of audio device 141 may include a speaker, a multi-speaker system, a home entertainment system, a television, a consumer appliance, a computer system, a mobile device, and a portable electronic media device, among other examples.

In various embodiments, audio device 141 may be arranged to generate tones, music, speech, speech utterances, sound effects, background noise, or other sounds based on audio data 141a received from apparatus 100, and produced by operating system 105, applications 106, and/or one or more other elements of apparatus 100. In some embodiments, audio data 141a may be associated with one or more user interface elements. For example, one or more particular user interface elements may comprise a video, and audio data 141a may comprise audio tracks corresponding to the video. The embodiments are not limited in this context.

In some embodiments, display 145 may be arranged to receive data from and/or transmit data to apparatus 100 and/or system 140 over a wired connection, a wireless connection, or a combination of both. In some embodiments, display 145 may comprise a transceiver 145a, and apparatus 100 and/or system 140 may implement a wireless connection with display 145 via transceiver 145a, using transceiver 144. In one embodiment, apparatus 100 and/or system 140 may be implemented in an electronic device that includes display 145 integrated into a single electronic device. Alternatively, apparatus 100 and/or system 140 and display 145 may be implemented in separate electronic devices. The embodiments are not limited in this context.

In general operation, apparatus 100 and/or system 140 may be operative to generate and transmit display instruction data corresponding to one or more user interface elements. For example, apparatus 100 and/or system 140 may be operative to generate display instruction data corresponding to a particular user interface element, and transmit that display instruction data to a display. The display may be operative to produce the particular user interface element based on the display instruction data. The embodiments are not limited in this context.

In traditional systems, an apparatus may comprise a non-3D-aware operating system, a 3D-aware graphics application, a non-3D aware graphics application, a 3D-aware graphics process corresponding to the 3D-aware graphics application, a non-3D-aware graphics process corresponding to the non-3D-aware graphics application, and a graphics management module, and may be coupled to a 3D display associated with both the 3D-aware graphics process and the non-3D-aware graphics process. The non-3D-aware operating system may be incapable of providing the graphics management module with 3D graphics display mode information. The graphics management module may be incapable of generating 3D graphics display mode information internally, and thus may be dependent upon the 3D-aware graphics application to transmit appropriate 3D graphics display mode information to cause the graphics management module to properly set the 3D graphics display mode corresponding to the 3D display.

At a particular point in time in a traditional system, the 3D-aware graphics process may be active, and the 3D display may be producing 3D user interface elements corresponding to the 3D-aware graphics process. The 3D graphics display mode may be in an enabled state with respect to the 3D display, to accommodate the 3D user interface elements associated with the 3D-aware graphics process. Subsequently, the 3D-aware graphics application may hang, crash, or otherwise terminate unexpectedly, and the 3D-aware graphics process may be deactivated and/or eliminated by the operating system without having transmitted 3D graphics display mode information to the graphics management module to disable the 3D graphics display mode. At this point, the operating system may activate the non-3D-aware graphics process if it is not already active. Since, in this example, both the operating system and the remaining graphics application are non-3D-aware, they will not require that the 3D graphics display mode be in an enabled state, because they will not require that the 3D display produce any 3D user interface elements, but will be unable to instruct the graphics management module to disable the 3D graphics display mode. As such, the 3D graphics display mode may unnecessarily persist in an enabled state in a traditional system, despite the fact that no 3D display instruction data is being generated.

Unnecessarily persisting the 3D graphics display mode in an enabled state may result in excess power consumption and/or display corruption. Various embodiments described herein may address these and other problems by using a graphics management module and a 3D graphics tracking module to keep track of associations between 3D-aware graphics processes, 3D graphics contexts, and 3D displays, and generating appropriate 3D graphics display mode information from within the graphics management module. Other embodiments are described and claimed.

In additional to the above-recited shortcomings, a traditional system may also comprise an apparatus comprising an operating system, a 3D-aware graphics application, a 3D-aware graphics process corresponding to the 3D-aware graphics application, and a graphics management module, and may be coupled to a 3D display associated with the 3D-aware graphics process. The 3D-aware graphics application may transmit a memory resource creation request to the graphics management module. The 3D display may have certain memory resource formatting constraints, compliance with which may be necessary in order to successfully cause the 3D display to correctly produce 3D user interface elements of a 3D graphics context stored in the memory resource. The display management module may be aware of these constraints. However, the graphics management module in a traditional system may be unaware of the identity of the 3D display associated with the 3D-aware graphics process. Therefore, the graphics management module may be unable to query the display management module in order to determine the memory resource formatting constraints of the 3D display, and thus unable to cause the memory management module to create a memory resource in the proper format. As a result, the 3D display in a traditional system may not correctly produce the 3D user interface elements of any 3D graphics contexts that the 3D-aware graphics application stores in the memory resource. Some embodiments described herein address these and other problems by using a graphics management module, a 3D graphics tracking module, and a display management module to ensure that each memory resource is created in the proper format. The embodiments are not limited in this respect.

Figure 1B:
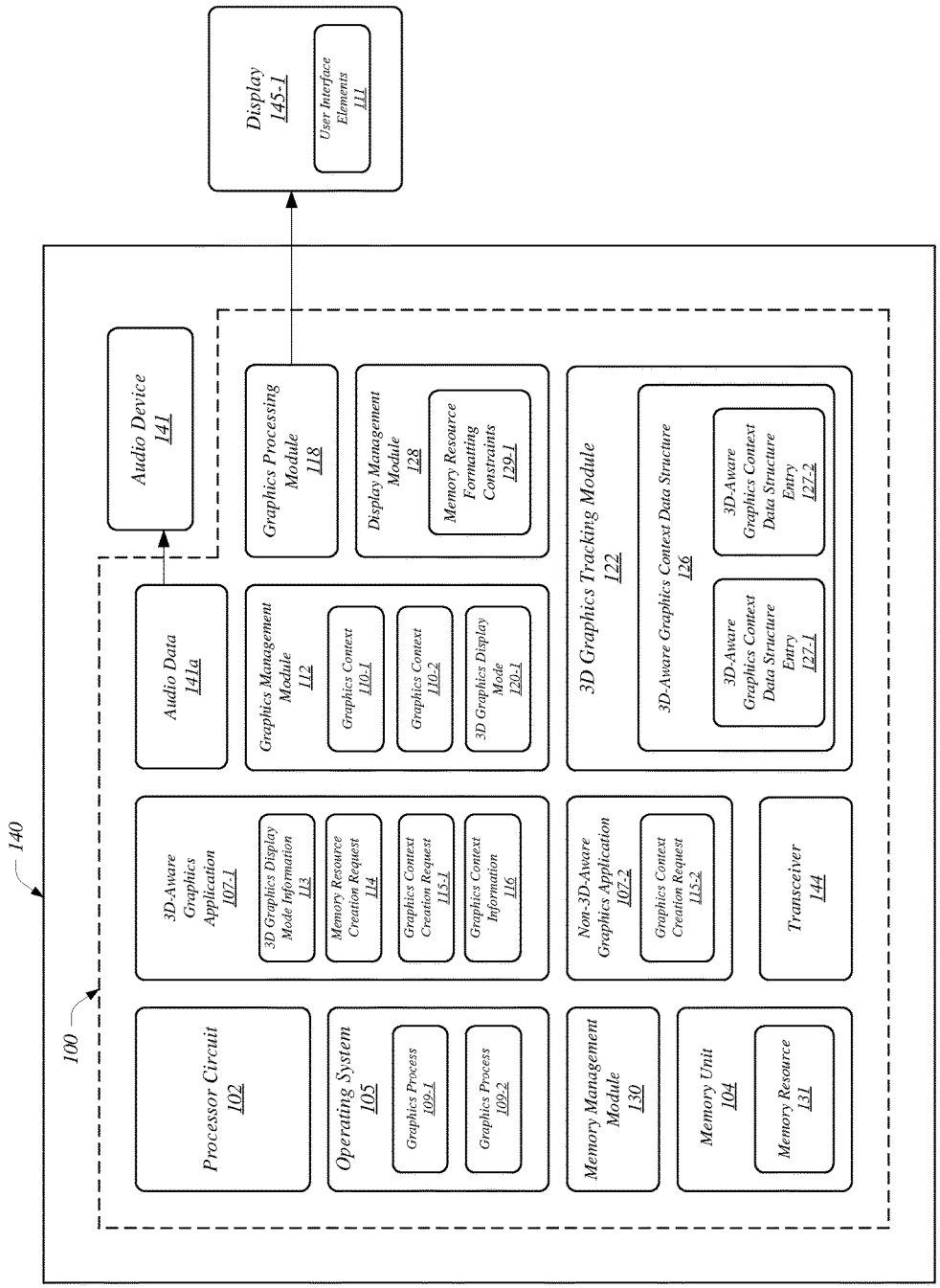
FIG. 1B illustrates another embodiment of the first apparatus and another embodiment of the first system.

FIG. 1B illustrates apparatus 100 and system 140 in more detail where like elements are similarly numbered. In various embodiments, with reference to FIG. 1B, a 3D-aware graphics application 107-1 may be operative to transmit 3D graphics display mode information 113 to graphics management module 112, to cause graphics management module 112 to set 3D graphics display mode 120-1 to an enabled state. Graphics management module 112 may be operative to receive 3D graphics display mode information 113 and set 3D graphics display mode 120-1 to an enabled state. Graphics management module 112 may determine that graphics application 107-1 is a 3D-aware graphics application based on the fact that graphics application 107-1 transmitted 3D graphics display mode information 113. Graphics process 109-1 may correspond to 3D-aware graphics application 107-1, and graphics management module 112 may determine that graphics process 109-1 is a 3D-aware graphics process based on this correspondence and its determination that graphics application 107-1 is a 3D-aware graphics application.

Graphics management module 112 may transmit 3D graphics tracking data to 3D graphics tracking module 122, to inform 3D graphics tracking module 122 that graphics process 109-1 is a 3D-aware graphics process. 3D graphics tracking module 122 may receive and process the 3D graphics tracking data. In some embodiments, 3D graphics tracking module 122 may comprise a 3D-aware graphics context data structure 126. 3D-aware graphics context data structure 126 may comprise any form of data structure suitable for holding, storing, recording, and/or maintaining 3D graphics tracking data, such as one or more tables, databases, and/or data stores, for example. 3D-aware graphics context data structure 126 may comprise one or more 3D-aware graphics context data structure entries. Each of the one or more 3D-aware graphics context data structure entries may comprise a graphics process identifier (ID) that identifies a graphics process 109-x as being a 3D-aware graphics process, and a display ID that identifies a display 109-y associated with 3D-aware graphics process 109-x. The contents of an example embodiment of 3D-aware graphics context data structure 126 are further discussed with respect to FIGS. 6A and 6B below.

In some embodiments in which 3D graphics tracking module 122 comprises a 3D-aware graphics context data structure 126, 3D graphics tracking module 122 may process the 3D graphics tracking data to determine that graphics process 109-1 is a 3D-aware graphics process, and add a 3D-aware graphics context data structure entry 127-1 to 3D-aware graphics context data structure 126. 3D-aware graphics context data structure entry 127-1 may comprise a graphics process ID that uniquely identifies graphics process 109-1 and indicates that graphics process 109-1 is a 3D-aware graphics process, and a display ID that uniquely identifies display 145-1 and indicates that display 145-1 is associated with graphics process 109-1.

In various embodiments, graphics application 107-1 may be operative to transmit a memory resource creation request 114 to graphics management module 112. Graphics management module 112 may receive the memory resource creation request 114, and transmit one or more instructions to memory management module 130, to request that a memory resource 131 be created and allocated to 3D-aware graphics process 109-1. If the display 145-1 associated with 3D-aware graphics process 109-1 is a 3D display, the memory resource 131 may need to comply with certain memory resource formatting constraints of display 145-1. Graphics management module 112 may be operative to retrieve memory resource formatting constraints 129-1 of display 145-1 from display management module 128. Graphics management module 112 may then transmit the memory resource creation request 114 based on memory resource formatting constraints 129-1, to ensure that memory management module 130 creates memory resource 131 in a format that complies with the memory resource formatting constraints of display 145-1.

In some embodiments, 3D-aware graphics application 107-1 may be operative to transmit a graphics context creation request 115-1 to graphics management module 112. Graphics context creation request 115-1 may comprise programming logic, data, and/or instructions usable by graphics management module 112 to create a graphics context 110-1. Graphics context creation request 115-1 may indicate that graphics context 110-1 will be associated with graphics process 109-1 and display 145-1.

Graphics management module 112 may be operative to receive graphics context creation request 115-1 and create graphics context 110-1. Based on the association of graphics context 110-1 with graphics process 109-1, graphics management module 112 may be further operative to query 3D graphics tracking module 122 to determine whether 3D-aware graphics context data structure 126 includes an entry corresponding to graphics process 109-1. Graphics management module 112 may determine that 3D-aware graphics context data structure 126 includes the entry 127-1 corresponding to graphics process 109-1. Based on the entry 127-1 in 3D-aware graphics context data structure 126 corresponding to graphics process 109-1, graphics management module 112 may determine that graphics process 109-1 is a 3D-aware graphics process, and thus that graphics context 110-1 is a 3D graphics context. Based on this determination, graphics management module 112 may transmit 3D graphics tracking data to 3D graphics tracking module 122, indicating that graphics context 110-1 is a 3D graphics context, and that it is associated with graphics process 109-1 and display 145-1. Upon receiving the 3D graphics tracking data, 3D graphics tracking module 122 may be operative to add an entry 127-2 to 3D graphics context data structure 126, the entry corresponding to graphics context 110-1 and indicating that graphics process 109-1 and display 145-1 are associated with graphics context 110-1.

In various embodiments, non-3D-aware graphics application 107-2 may be operative to transmit a graphics context creation request 115-2 to graphics management module 112. Graphics context creation request 115-2 may comprise programming logic, data, and/or instructions usable by graphics management module 112 to create a graphics context 110-2. Graphics context creation request 115-2 may indicate that graphics context 110-2 will be associated with graphics process 109-2 and display 145-1. Graphics management module 112 may be operative to receive graphics context creation request 115-2 and create graphics context 110-2. Based on the association of graphics context 110-2 with graphics process 109-2, graphics management module 112 may be further operative to query 3D graphics tracking module 122 to determine whether 3D-aware graphics context data structure 126 includes an entry corresponding to graphics process 109-2.

Graphics management module 112 may determine that 3D-aware graphics context data structure 126 does not include an entry corresponding to graphics process 109-2. Based on the absence of an entry in 3D-aware graphics context data structure 126 corresponding to graphics process 109-2, graphics management module 112 may determine that graphics process 109-2 is a non-3D-aware graphics process, and thus that graphics context 110-2 is a non-3D graphics context. Based on this determination, graphics management module 112 may not transmit 3D graphics tracking data pertaining to graphics context 110-2 to 3D graphics tracking module 122. The embodiments are not limited to these examples.

In some embodiments, graphics application 107-1 may be operative to generate graphics context information 116 associated with graphics context 110-1. Graphics context information 116 may comprise programming logic, data, and/or instructions indicating one or more operations to be performed using graphics context 110-1. For example, graphics context information 116 may comprise instructions to render display data associated with graphics context 110-1 on one or more graphics frame buffers, or to transmit display data associated with graphics context 110-1 from the one or more graphics frame buffers to one or more other internal or external components that generate user interface elements 111-t based on the display data in the one or more graphics frame buffers.

Graphics application 107-1 may transmit graphics context information 116 to graphics management module 112. Graphics management module 112 may be operative to receive graphics context information 116 and cause graphics processing module 118 to execute the one or more operations to be performed on graphics context 110-1. Graphics management module 112 may query 3D graphics tracking module 122 to determine whether graphics processing module 118 should execute the one or more operations with a 3D graphics display mode 120-1, corresponding to display 145-1, in an enabled state. More particularly, graphics management module 112 may be operative to query 3D graphics tracking module 122 to determine whether 3D-aware graphics context data structure 126 contains an entry corresponding to graphics context 110-1. Graphics management module 112 may determine that 3D-aware graphics context data structure 126 contains the entry 127-2 corresponding to graphics context 110-1, and execute graphics context 110-1 with 3D graphics display mode 120-1 set to an enabled state. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 2 illustrates one embodiment of a logic flow 200, which may be representative of the operations executed by one or more embodiments described herein. As shown in logic flow 200, 3D graphics display mode information associated with a graphics process may be received at block 260. For example, graphics management module 112 of FIG. 1B may receive 3D graphics display mode information 113 associated with graphics process 109-1. At block 261, it may be determined whether the graphics process is 3D-aware based on the 3D graphics display mode information. For example, graphics management module 112 of FIG. 1B may determine whether graphics process 109-1 is 3D-aware based on 3D graphics display mode information 113.

At block 262a, it may be determined that the graphics process is 3D-aware, and the flow may proceed to block 263. For example, graphics management module 112 of FIG. 1B may determine that graphics process 109-1 is 3D-aware, and the flow may proceed to block 263. At block 263, an entry corresponding to the graphics process may be added to a 3D-aware graphics context data structure. For example, 3D graphics tracking module 122 of FIG. 1B may add an entry corresponding to graphics process 109-1 to 3D-aware graphics context data structure 126. Following block 263, the flow may end. Alternatively, at block 262b, it may be determined that the graphics process is non-3D-aware. For example, graphics management module 112 of FIG. 1B may determine that graphics process 109-1 is non-3D-aware. Following block 262b, the flow may end.

Figure 3:
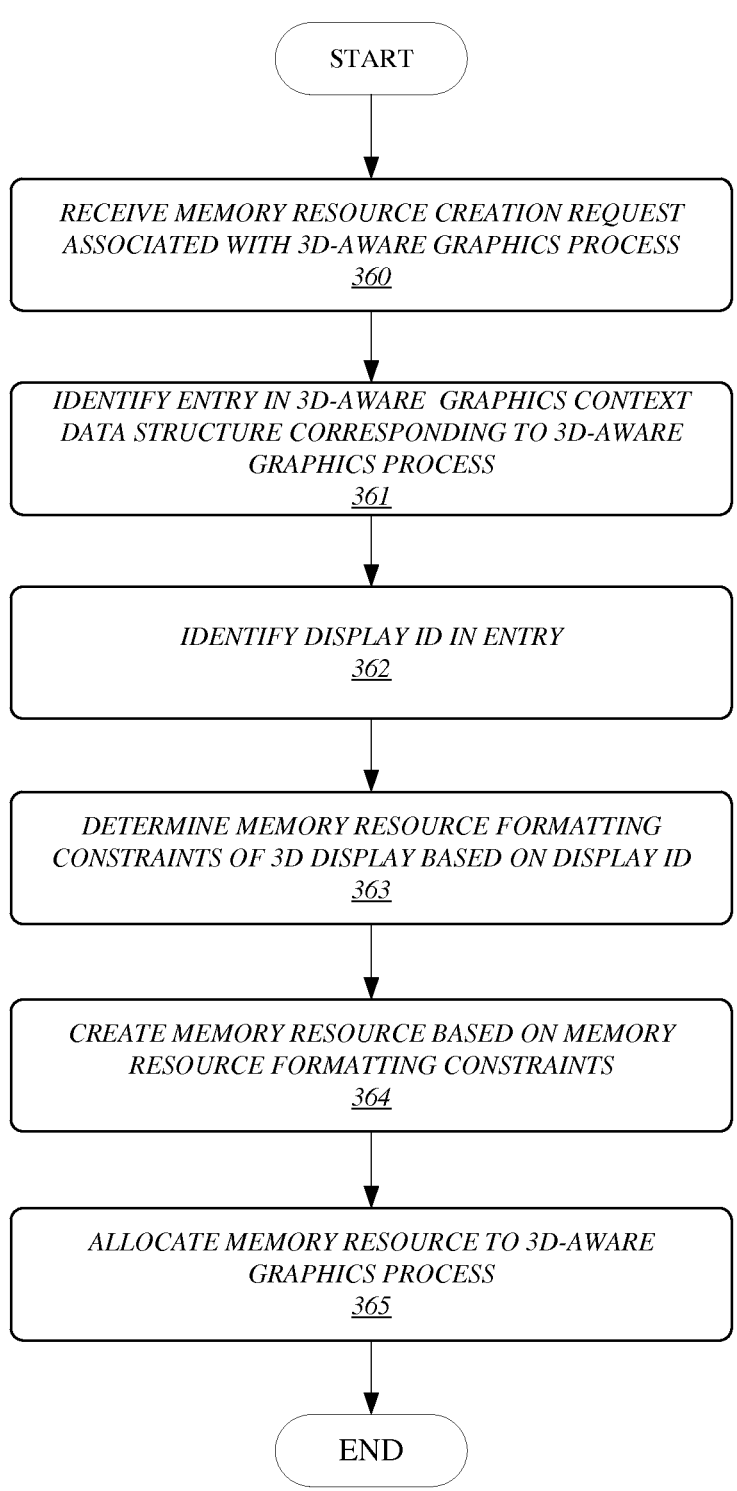
FIG. 3 illustrates one embodiment of a second logic flow.

FIG. 3 illustrates one embodiment of a logic flow 300, which may be representative of the operations executed by one or more embodiments described herein. As shown in logic flow 300, a memory resource creation request associated with a 3D-aware graphics process may be received at block 360. For example, graphics management module 112 of FIG. 1B may receive memory resource creation request 114 associated with graphics process 109-1. At block 361, an entry in a 3D-aware graphics context data structure corresponding to the 3D-aware graphics process may be identified. For example, 3D graphics tracking module 122 of FIG. 1B may identify 3D-aware graphics context data structure entry 127-1 in 3D-aware graphics context data structure 126 as being associated with 3D-aware graphics process 109-1.

At block 362, a display ID in the entry in the 3D-aware graphics context data structure may be identified. For example, 3D graphics tracking module 122 of FIG. 1B may identify a display ID corresponding to display 145-1 in the entry 127-1 in 3D-aware graphics context data structure 126. At block 363, one or more memory resource formatting constraints of the display identified by the display ID may be determined. For example, display management module 128 of FIG. 1B may determine memory resource formatting constraints 129-1 of display 145-1. At block 364, a memory resource may be created based on the one or more memory resource formatting constraints. For example, memory management module 130 of FIG. 1B may create a memory resource based on memory resource formatting constraints 129-1. At block 365, the memory resource may be allocated to the 3D-aware graphics process. For example, memory management module 130 of FIG. 1B may allocate memory resource 131 to 3D-aware graphics process 109-1.

Figure 4:
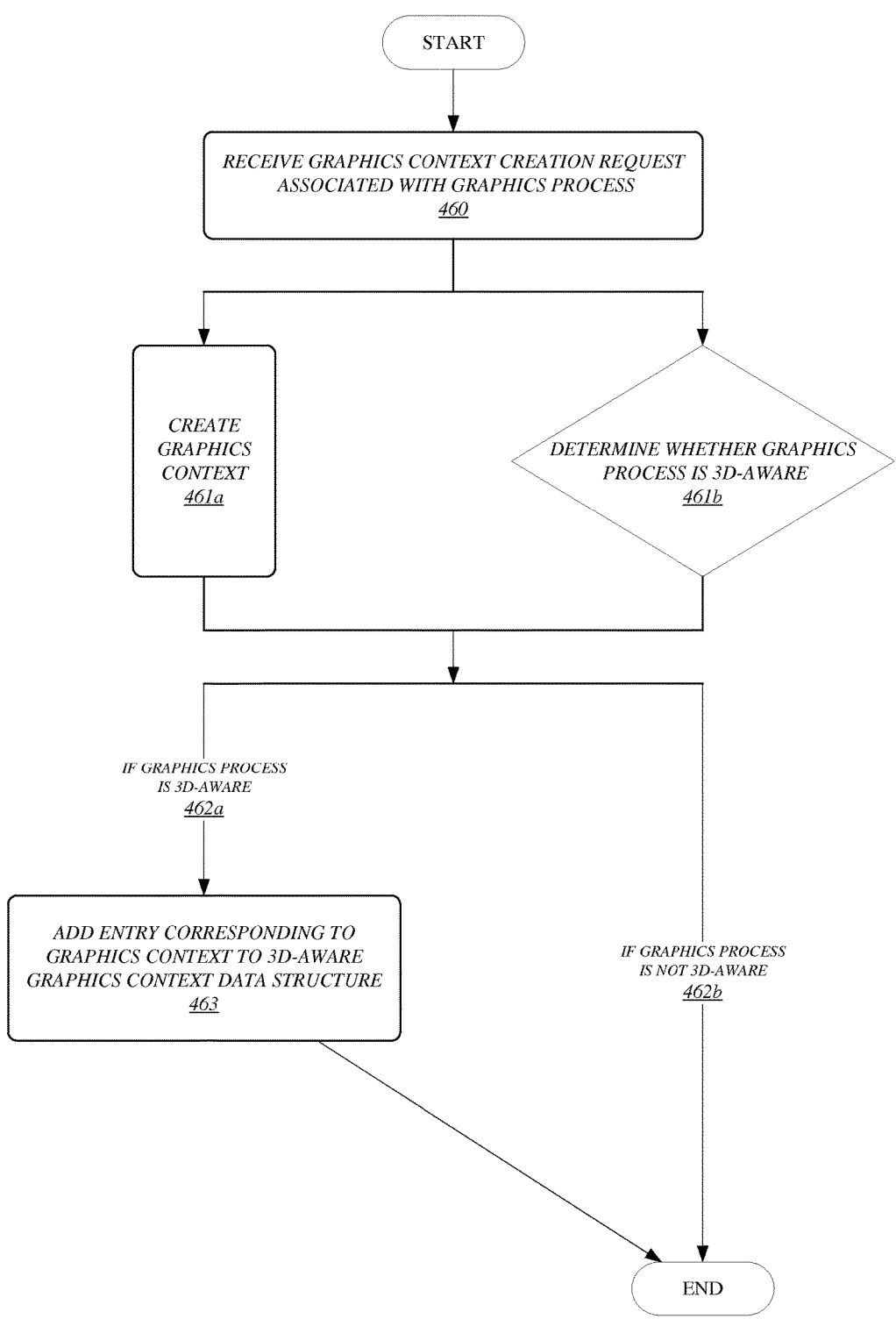
FIG. 4 illustrates one embodiment of a third logic flow.

FIG. 4 illustrates one embodiment of a logic flow 400, which may be representative of the operations executed by one or more embodiments described herein. As shown in logic flow 400, a graphics context creation request associated with a graphics process may be received at block 460. For example, graphics management module 112 of FIG. 1B may receive graphics context creation request 115-1 associated with graphics process 109-1. Flow may then pass to blocks 461*a* and 461*b* in parallel. At block 461*a*, a graphics context may be created. For example, graphics management module 112 of FIG. 1B may create graphics context 110-1. At block 461*b*, it may be determined whether the graphics process is 3D-aware. For example, graphics management module 112 of FIG. 1B may determine whether graphics process 109-1 is 3D-aware based on whether an entry corresponding to graphics process 109-1 appears in 3D-aware graphics context data structure 126.

Once blocks 461*a* and 461*b* are complete, the flow may pass either to block 462*a* or block 462*b*. At block 462*a*, it may be determined that the graphics process is 3D-aware, and flow may pass to block 463. For example, graphics management module 112 of FIG. 1B may determine that graphics process 109-1 is 3D-aware, and flow may pass to block 463. At block 463, an entry corresponding to the graphics context may be added to the 3D-aware graphics context data structure. For example, 3D graphics tracking module 122 of FIG. 1B may add an entry corresponding to graphics context 110-1 to 3D-aware graphics context data structure 126. Following block 463, the flow may end. Alternatively, at block 462*b*, it may be determined that the graphics process is non-3D-aware. For example, graphics management module 112 of FIG. 1B may determine that graphics process 109-1 is non-3D-aware. Following block 462*b*, the flow may end.

FIG. 5 illustrates one embodiment of a logic flow 500, which may be representative of the operations executed by one or more embodiments described herein. As shown in logic flow 500, graphics context information associated with a graphics context may be received at block 560. For example, graphics management module 112 of FIG. 1B may receive graphics context information 116 associated with graphics context 110-1. At block 561, it may be determined whether the graphics context is a 3D graphics context. For example, graphics management module 112 of FIG. 1B may determine whether graphics context 110-1 is a 3D graphics context based on whether an entry corresponding to graphics context 110-1 appears in 3D-aware graphics context data structure 126. The flow may then pass to either block 562*a* or block 562*b*. At block 562*a*, it may be determined that the graphics context is a 3D graphics context, and flow may pass to block 563*a*. For example, graphics management module 112 of FIG. 1B may determine that graphics context 110-1 is a 3D graphics context, and flow may pass to block 563*a*. At block 562*b*, it may be determined that the graphics context is not a 3D graphics context, and flow may pass to block 563*b*. For example, graphics management module 112 of FIG. 1B may determine that graphics context 110-1 is not a 3D graphics context, and flow may pass to block 563*b*.

At block 563*a*, the graphics context information may be executed with a 3D graphics display mode in an enabled state. For example, graphics processing module 118 may execute graphics context information 116 with 3D graphics display mode 120-1 in an enabled state. Following block 563*a*, the flow may end. At block 563*b*, the graphics context information may be executed with a 3D graphics display mode in a disabled state. For example, graphics processing module 118 may execute graphics context information 116 with 3D graphics display mode 120-1 in a disabled state. Following block 563*b*, the method may end.

FIG. 6A illustrates an embodiment 600A of a 3D-aware graphics context data structure. 3D-aware graphics context data structure 600A comprises an entry 627-1, which includes a context ID 627-1-*a*, a process ID 627-1-*b*, and a display ID 627-1-*c*. 3D-aware graphics context data structure 600A also comprises an entry 627-2, which includes a context ID 627-2-*a*, a process ID 627-2-*b*, and a display ID 627-2-*c*. Context IDs 627-1-*a* and 627-2-*a* may uniquely identify graphics contexts, process IDs 627-1-*b* and 627-2-*b* may uniquely identify graphics processes, and display IDs 627-1-*c* and 627-2-*c* may uniquely identify displays. Apparatus 100 and/or system 140 may determine from entries 627-1 and 627-2 that the graphics contexts identified by context IDs 627-1-*a* and 627-2-*a* correspond to the graphics processes identified by process IDs 627-1-*b* and 627-2-*b*, and to the displays uniquely identified by display IDs 627-1-*c* and 627-2-*c*, respectively.

FIG. 6B illustrates an embodiment 600B of a 3D-aware graphics context data structure. Embodiment 600B illustrates an embodiment which may result when a third entry is added to a 3D-aware graphics context data structure such as 3D-aware graphics context data structure 600A in FIG. 6A. 3D-aware graphics context data structure 600B contains the same entries 627-1 and 627-2 as does 3D-aware graphics context data structure 600A. However, in 3D-aware graphics context data structure 600B, a third entry 627-3 has been added. Entry 627-3 includes a context ID 627-3-*a*, a process ID 627-3-*b*, and a display ID 627-3-*c*. Context ID 627-3-*a* may uniquely identify a graphics context, process ID 627-3-*b* may uniquely identify a graphics process, and display ID 627-3-*c* may uniquely identify a display. In various embodiments, apparatus 100 and/or system 140 may add entry 627-3 to 3D-aware graphics context data structure 600A, and thus produce 3D-aware graphics context data structure 600B, based on having determined that the graphics context identified by context ID 627-3-*a* corresponds to the graphics process uniquely identified by process ID 627-3-*b* and the display uniquely identified by display ID 627-3-*c*, and having determined that the graphics process uniquely identified by process ID 627-3-*b* is a 3D-aware graphics process. For example, graphics management module 112 in FIG. 1B may have received a 3D-aware graphics context creation request 115-1 from the graphics application 107-1 associated with graphics process 109-1, and determined that graphics process 109-1 is a 3D-aware graphics process. Graphics management module 112 may thereby have also determined that graphics context 110-1 is a 3D-aware graphics context, and corresponds to graphics process 109-1 and display 145-1. Graphics management module 112 may add entry 627-3 to 3D-aware graphics context data structure 126 accordingly. The embodiments are not limited in this context.

Figure 7:
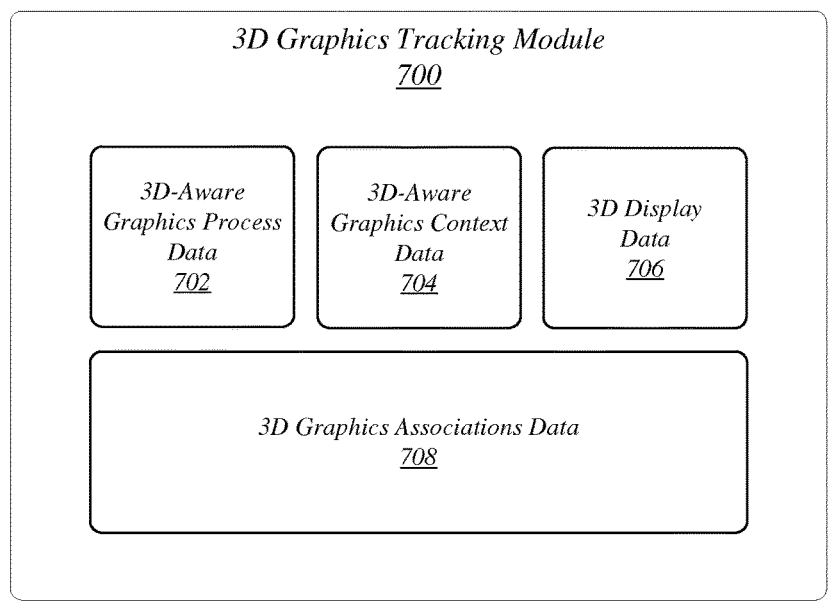
FIG. 7 illustrates one embodiment of a second apparatus.

FIG. 7 illustrates an embodiment of a 3D graphics tracking module 700. 3D graphics tracking module 700 may be used as a component of apparatus 100 and/or system 140, and may comprise an alternative embodiment of 3D graphics tracking module 122. 3D graphics tracking module 700 comprises 3D-aware graphics process data 702, 3D graphics context data 704, 3D display data 706, and 3D graphics associations data 708. 3D-aware graphics process data 702 may comprise process IDs for one or more 3D-aware graphics processes. 3D graphics context data 704 may comprise context IDs for one or more 3D graphics contexts.

3D display data 706 may comprise display IDs for one or more 3D displays. 3D graphics associations data 708 may comprise programming logic, data, information, or algorithms usable to determine associations and/or correspondences between 3D-aware graphics processes, 3D graphics contexts, and 3D displays identified by the process IDs, context IDs, and display IDs in 3D-aware graphics process data 702, 3D graphics context data 704, and 3D display data 706. For example, 3D-aware graphics process data 702 may comprise a process ID uniquely identifying graphics process 109-1 in FIG. 1B. 3D graphics context data 704 may comprise a context ID uniquely identifying graphics context 110-1 in FIG. 1B. 3D display data 706 may comprise a display ID uniquely identifying display 145-1 in FIG. 1B.

Based on the presence of these identifiers in their respective data elements, 3D graphics tracking module 700 may be operative to indicate, in response to a query from graphics management module 112 of FIG. 1B, that graphics process 109-1 is a 3D-aware graphics process, graphics context 110-1 is a 3D graphics context, and display 145-1 is a 3D display. 3D graphics associations data may comprise data indicating that graphics context 110-1 corresponds to graphics process 109-1 and display 145-1. 3D graphics tracking module 700 may be further operative to indicate these associations in response to the query from graphics management module 112 of FIG. 1B. The embodiments are not limited in this context.

Figure 8:
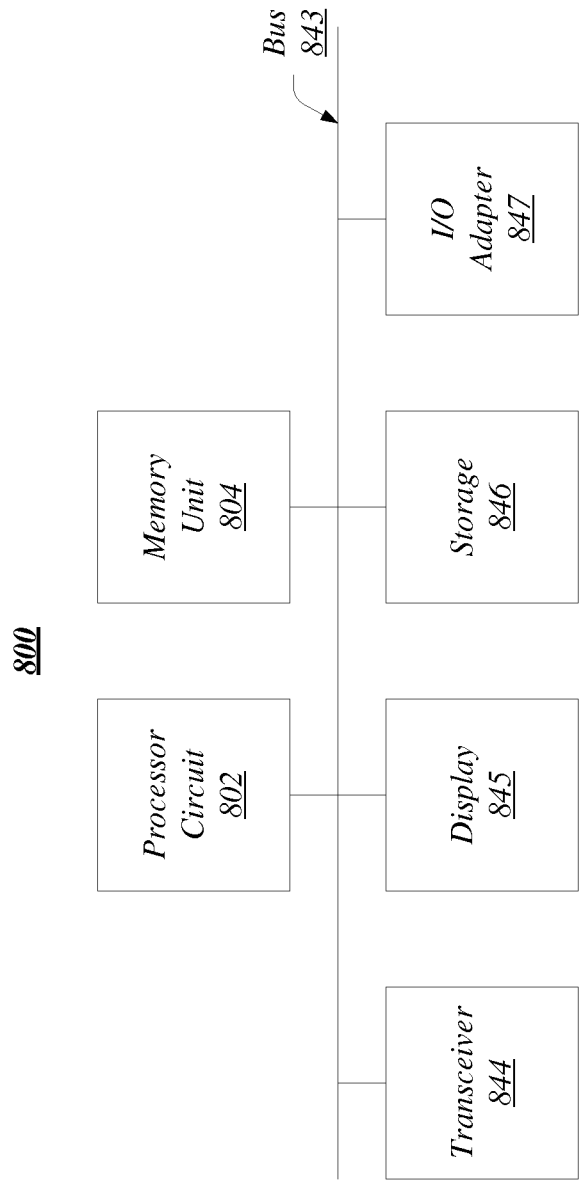
FIG. 8 illustrates one embodiment of a second system.

FIG. 8 illustrates one embodiment of a system 800. In various embodiments, system 800 may be representative of a system or architecture suitable for use with one or more embodiments described herein, such as apparatus 100 and/or system 140 of FIGS. 1A and/or 1B, logic flow 200 of FIG. 2, logic flow 300 of FIG. 3, logic flow 400 of FIG. 4, or logic flow 500 of FIG. 5. The embodiments are not limited in this respect.

As shown in FIG. 8, system 800 may comprise multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a processor circuit 802. Processor circuit 802 may be implemented using any processor or logic device, and may be the same as or similar to processor circuit 102 of FIG. 1.

In one embodiment, system 800 may include a memory unit 804 to couple to processor circuit 802. Memory unit 804 may be coupled to processor circuit 802 via communications bus 843, or by a dedicated communications bus between processor circuit 802 and memory unit 804, as desired for a given implementation. Memory unit 804 may be implemented using any machine-readable or computer-readable media capable of storing data, including both volatile and non-volatile memory and may be the same as or similar to memory unit 104 of FIG. 1.

In various embodiments, system 800 may include a transceiver 844. Transceiver 844 may include one or more radios capable of transmitting and receiving signals using various suitable wireless communications techniques, and may be the same as or similar to transceiver 144 of FIG. 1. Such techniques may involve communications across one or more wireless networks. In communicating across such networks, transceiver 844 may operate in accordance with one or more applicable standards in any version. The embodiments are not limited in this context.

In various embodiments, system 800 may include a display 845. Display 845 may comprise any television type monitor or display. Display 845 may comprise any display device capable of displaying information received from processor circuit 802, and may be the same as or similar to display 145 of FIG. 1. The embodiments are not limited in this context.

In various embodiments, system 800 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may comprise technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 800 may include one or more I/O adapters 847. Examples of I/O adapters 847 may include Universal Serial Bus (USB) ports/adapters, IEEE 1394 Firewire ports/adapters, and so forth. The embodiments are not limited in this context.

FIG. 9 illustrates an embodiment of a system 900. In various embodiments, system 900 may be representative of a system or architecture suitable for use with one or more embodiments described herein, such as apparatus 100 and/or system 140 of FIGS. 1A and/or 1B, logic flow 200 of FIG. 2, logic flow 300 of FIG. 3, logic flow 400 of FIG. 4, logic flow 500 of FIG. 5, or system 800 of FIG. 8. The embodiments are not limited in this respect.

As shown in FIG. 9, system 900 may comprise multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 comprises a platform 901 coupled to a display 945. Platform 901 may receive content from a content device such as content services device(s) 948 or content delivery device(s) 949 or other similar content sources. A navigation controller 950 comprising one or more navigation features may be used to interact with, for example, platform 901 and/or display 945. Each of these components is described in more detail below.

In embodiments, platform 901 may comprise any combination of a processor circuit 902, chipset 903, memory unit 904, transceiver 944, storage 946, applications 906, and/or graphics subsystem 951. Chipset 903 may provide intercommunication among processor circuit 902, memory unit 904, transceiver 944, storage 946, applications 906, and/or graphics subsystem 951. For example, chipset 903 may include a storage adapter (not depicted) capable of providing intercommunication with storage 946.

Processor circuit 902 may be implemented using any processor or logic device, and may be the same as or similar to processor circuit 102 in FIG. 1.

Memory unit 904 may be implemented using any machine-readable or computer-readable media capable of storing data, and may be the same as or similar to memory unit 104 in FIG. 1.

Transceiver 944 may include one or more radios capable of transmitting and receiving signals using various suitable wireless communications techniques, and may be the same as or similar to transceiver 144 in FIG. 1.

Display 945 may comprise any television type monitor or display, and may be the same as or similar to display 145 in FIG. 1.

Storage 946 may be implemented as a non-volatile storage device, and may be the same as or similar to storage 846 in FIG. 8.

Graphics subsystem 951 may perform processing of images such as still or video for display. Graphics subsystem 951 may be a graphics processing unit (GPU) or a visual processing unit (VPU), for example. An analog or digital interface may be used to communicatively couple graphics subsystem 951 and display 945. For example, the interface may be any of a High-Definition Multimedia Interface, DisplayPort, wireless HDMI, and/or wireless HD compliant techniques. Graphics subsystem 951 could be integrated into processor circuit 902 or chipset 903. Graphics subsystem 951 could be a stand-alone card communicatively coupled to chipset 903.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 948 may be hosted by any national, international and/or independent service and thus accessible to platform 901 via the Internet, for example. Content services device(s) 948 may be coupled to platform 901 and/or to display 945. Platform 901 and/or content services device(s) 948 may be coupled to a network 953 to communicate (e.g., send and/or receive) media information to and from network 953. Content delivery device(s) 949 also may be coupled to platform 901 and/or to display 945.

In embodiments, content services device(s) 948 may comprise a cable television box, personal computer, network, telephone, Internet enabled devices or appliance capable of delivering digital information and/or content, and any other similar device capable of unidirectionally or bidirectionally communicating content between content providers and platform 901 and/display 945, via network 953 or directly. It will be appreciated that the content may be communicated unidirectionally and/or bidirectionally to and from any one of the components in system 900 and a content provider via network 953. Examples of content may include any media information including, for example, video, music, medical and gaming information, and so forth.

Content services device(s) 948 receives content such as cable television programming including media information, digital information, and/or other content. Examples of content providers may include any cable or satellite television or radio or Internet content providers. The provided examples are not meant to limit embodiments of the invention.

In embodiments, platform 901 may receive control signals from navigation controller 950 having one or more navigation features. The navigation features of navigation controller 950 may be used to interact with a user interface 954, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be echoed on a display (e.g., display 945) by movements of a pointer, cursor, focus ring, or other visual indicators displayed on the display. For example, under the control of software applications 906, the navigation features located on navigation controller 950 may be mapped to virtual navigation features displayed on user interface 954. In embodiments, navigation controller 950 may not be a separate component but integrated into platform 901 and/or display 945. Embodiments, however, are not limited to the elements or in the context shown or described herein.

In embodiments, drivers (not shown) may comprise technology to enable users to instantly turn on and off platform 901 like a television with the touch of a button after initial boot-up, when enabled, for example. Program logic may allow platform 901 to stream content to media adaptors or other content services device(s) 948 or content delivery device(s) 949 when the platform is turned "off." In addition, chip set 903 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 900 may be integrated. For example, platform 901 and content services device(s) 948 may be integrated, or platform 901 and content delivery device(s) 949 may be integrated, or platform 901, content services device(s) 948, and content delivery device(s) 949 may be integrated, for example. In various embodiments, platform 901 and display 945 may be an integrated unit. Display 945 and content service device(s) 948 may be integrated, or display 945 and content delivery device(s) 949 may be integrated, for example. These examples are not meant to limit the invention.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 901 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text, and so forth. Data from a voice conversation may be, for example, speech information, silence periods, background noise, comfort noise, tones, and so forth. Control information may refer to any data representing commands, instructions, or control words meant for an automated system. For example, control information may be used to route media information through a system, or instruct a node to process the media information in a predetermined manner. The embodiments, however, are not limited to the elements or in the context shown or described in FIG. 9.

Figure 10:
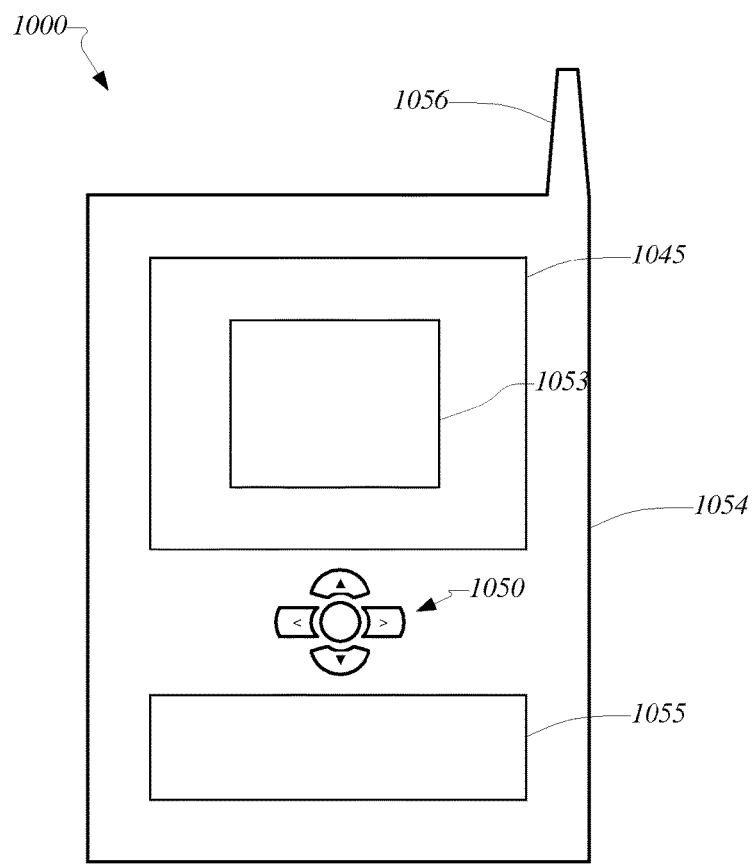
FIG. 10 illustrates one embodiment of a device.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may comprise a display 1045, a navigation controller 1050, a user interface 1053, a housing 1054, an I/O device 1055, and an antenna 1056. Display 1045 may comprise any suitable display unit for displaying information appropriate for a mobile computing device, and may be the same as or similar to display 945 in FIG. 9. Navigation controller 1050 may comprise one or more navigation features which may be used to interact with user interface 1053, and may be the same as or similar to navigation controller 950 in FIG. 9. I/O device 1055 may comprise any suitable I/O device for entering information into a mobile computing device. Examples for I/O device 1055 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds, and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    identifying, by a processor circuit, a graphics context associated with context information received from a graphics application;
    determining whether a three dimensional (3D)-aware graphics context data structure includes any entry corresponding to the graphics context, by determining whether a graphics process associated with the graphics context corresponds to a graphics process identifier (ID) in any entry in the 3D-aware graphics context data structure, wherein each entry comprises a graphics process identifier (ID) to uniquely identify a graphics process that is 3D aware, a context ID to identify a context associated with the graphics process, and a display ID to identify a display associated with the graphics process and the context;
    in response to a determination that the 3D-aware graphics context data structure includes an entry corresponding to the graphics context, causing the context information to be executed in a 3D display mode;
    in response to a determination that the entry corresponding to the graphics context is absent from the 3D-aware graphics context data structure, causing the context information to be executed in a 2D display mode;
    receiving a graphics context creation request associated with the graphics process;
    generating the graphics context based on the graphics context creation request; and
    adding the entry corresponding to the graphics context to the 3D-aware graphics context data structure in response to a determination that the graphics process is 3D-aware.

2. The method of claim 1, comprising determining whether the graphics process is 3D-aware based on received 3D graphics display mode information associated with the graphics process.

3. The method of claim 1, comprising:
    receiving a memory resource creation request associated with a 3D-aware graphics process;
    identifying an entry in the 3D-aware graphics context data structure corresponding to the 3D-aware graphics process and comprising a second display ID corresponding to a 3D display;

determining one or more memory resource formatting constraints of the 3D display based on the second display ID;

creating a memory resource based on the one or more memory resource formatting requirements; and allocating the memory resource to the 3D-aware graphics process.

4. At least one non-transitory computer-readable storage medium comprising a set of instructions that, in response to being executed on processing circuitry of a computing device, cause the processing circuitry to:

identify a graphics context associated with context information received from a graphics application;

determine whether a three dimensional (3D)-aware graphics context data structure includes any entry corresponding to the graphics context, by determining whether a graphics process associated with the graphics context corresponds to a graphics process identifier (ID) in any entry in the 3D-aware graphics context data structure, wherein each entry comprises a graphics process identifier (ID) to uniquely identify a graphics process that is 3D aware, a context ID to identify a context associated with the graphics process, and a display ID to identify a display associated with the graphics process and the context;

in response to a determination that the 3D-aware graphics context data structure includes an entry corresponding to the graphics context, cause the context information to be executed in a 3D display mode;

in response to a determination that the entry corresponding to the graphics context is absent from the 3D-aware graphics context data structure, causing the context information to be executed in a 2D display mode;

generate the graphics context based on a received graphics context creation request associated with the graphics process; and add the entry corresponding to the graphics context to the 3D-aware graphics context data structure in response to a determination that the graphics process is 3D-aware.

5. The at least one non-transitory computer-readable storage medium of claim 4, comprising instructions that, in response to being executed on the processing circuitry, cause the processing circuitry to determine whether the graphics process is 3D-aware based on received 3D graphics display mode information associated with the graphics process.

6. The at least one non-transitory computer-readable storage medium of claim 4, comprising instructions that, in response to being executed on the processing circuitry, cause the processing circuitry to:

receive a memory resource creation request associated with a 3D-aware graphics process;

identify an entry in the 3D-aware graphics context data structure corresponding to the 3D-aware graphics process and comprising a second display ID corresponding to a 3D display;

determine one or more memory resource formatting requirements of the 3D display based on the second display ID;

create a memory resource based on the one or more memory resource formatting requirements; and allocate the memory resource to the 3D-aware graphics process.

7. An apparatus, comprising:

processing circuitry; and non-transitory computer-readable storage media having stored thereon instructions that, when executed by the processing circuitry, cause the processing circuitry to:

identify a graphics context associated with context information received from a graphics application;

determine whether a three dimensional (3D)-aware graphics context data structure includes any entry corresponding to the graphics context, by a determination of whether a graphics process associated with the graphics context corresponds to a graphics process identifier (ID) in any entry in the 3D-aware graphics context data structure, wherein each entry comprises a graphics process identifier (ID) to uniquely identify a graphics process that is 3D aware, a context ID to identify a context associated with the graphics process, and a display ID to identify a display associated with the graphics process and the context;

in response to a determination that the 3D-aware graphics context data structure includes an entry corresponding to the graphics context, cause the context information to be executed in a 3D display mode;

in response to a determination that an entry corresponding to the graphics context is absent from the 3D-aware graphics context data structure, causing the context information to be executed in a 2D display mode;

generate the graphics context based on a received graphics context creation request associated with the graphics process; and add the entry corresponding to the graphics context to the 3D-aware graphics context data structure in response to a determination that the graphics process is 3D-aware.

8. The apparatus of claim 7, the non-transitory computer-readable storage media having stored thereon instructions that, when executed by the processing circuitry, cause the processing circuitry to determine whether the graphics process is 3D-aware based on received 3D graphics display mode information associated with the graphics process.

9. The apparatus of claim 7, the non-transitory computer-readable storage media having stored thereon instructions that, when executed by the processing circuitry, cause the processing circuitry to:

receive a memory resource creation request associated with a 3D-aware graphics process;

identify an entry in the 3D-aware graphics context data structure corresponding to the 3D-aware graphics process and comprising a second display ID corresponding to a 3D display;

determine one or more memory resource formatting requirements of the 3D display based on the second display ID;

create a memory resource based on the one or more memory resource formatting requirements; and allocate the memory resource to the 3D-aware graphics process.

* * * * *